United States Patent [19]

Gildea et al.

[11] Patent Number: 5,256,067
[45] Date of Patent: Oct. 26, 1993

[54] DEVICE AND METHOD FOR OPTIMAL READING VOCABULARY DEVELOPMENT

[76] Inventors: Patricia M. Gildea, 39 Cranbury Neck Rd., Cranbury, N.J. 08512; Cheryl L. Wurtenberg, 4746 Lansing St., Philadelphia, Pa. 19136; George A. Miller, 753 Prospect St., Princeton, N.J. 08540

[21] Appl. No.: 514,660

[22] Filed: Apr. 25, 1990

[51] Int. Cl.[5] .................................. G09B 5/00
[52] U.S. Cl. .................... 434/169; 434/167; 434/178; 434/327; 364/419
[58] Field of Search ............ 434/156, 157, 167, 176, 434/169, 178, 307, 308, 322, 327, 347, 365; 364/900 MS File, 419; 340/711

[56] References Cited

U.S. PATENT DOCUMENTS

| | | | |
|---|---|---|---|
| 4,159,417 | 6/1979 | Rubincam | 235/375 |
| 4,406,626 | 9/1983 | Anderson et al. | 434/169 |
| 4,579,533 | 4/1986 | Anderson et al. | 434/157 |
| 4,685,060 | 8/1987 | Yamano et al. | 364/419 |
| 4,774,596 | 9/1988 | Hashimoto | 364/419 X |
| 4,774,666 | 9/1988 | Miyao et al. | 364/419 |
| 4,854,878 | 8/1989 | Malvino et al. | 434/335 |
| 4,860,206 | 8/1989 | Kugimiya et al. | 434/167 X |
| 4,912,671 | 3/1990 | Ishida | 434/157 X |

OTHER PUBLICATIONS

George A. Miller & Patricia M. Gildea, *How Children Learn Words*, Scientific American, pp. 94-99 (Sep. 1987).

Cheryl L. Wurtenberg & Patricia M. Gildea, *Illustrative Sentences: An Alternative Approach to Learning About Words*, Apr. 1988 Eastern Psychological Association Annual Meeting Record.

*Primary Examiner*—Richard J. Apley
*Assistant Examiner*—Joe H. Cheng
*Attorney, Agent, or Firm*—Howard S. Robbins

[57] ABSTRACT

An educational device (10) for facilitating vocabulary development includes a display (11) for displaying reading text, a keyboard (12) and microprocessor (14). The reader selects target words or short phrases whose meaning may be unfamiliar. A context-sensitive sentence illustrating the meaning of the selected portion of the reading text and including the target word or phrase is provided and displayed for a first preselected period. The target word or phrase in the context-sensitive sentence is replaced with verification text and displayed for a second preselected period. A test function furnishes context-sensitive questions that check the reader's understanding of the correct meaning. Performance information is collected and presented upon request.

8 Claims, 4 Drawing Sheets

41 — As Canon Parfitt grew older, his SILHOUETTE changed slightly.

11 — Canon Parfitt panted a little. Running for trains was not much of a business
44 — for a man his age. For one thing his figure was not what it was and with the loss of his slender silhouette went an

FIG-4

53 — As Canon Parfitt grew older, his FIGURE changed slightly.

11 — Canon Parfitt panted a little. Running for trains was not much of a business
44 — for a man his age. For one thing his figure was not what it was and with the loss of his slender silhouette went an

FIG-5

61 — Did the Canon's SILHOUETTE become smaller as he became older?
        YES        NO
11 — Canon Parfitt panted a little. Running for trains was not much of a business
44 — for a man his age. For one thing his figure was not what it was and with the loss of his slender silhouette went an

FIG-6

63 — This story: studied 1   correct 1 /1
     Overall: studied 1   correct 1 /1

11 — Canon Parfitt panted a little. Running for trains was not much of a business
44 — for a man his age. For one thing his figure was not what it was and with the loss of his slender silhouette went an

FIG-7

DEVICE AND METHOD FOR OPTIMAL READING VOCABULARY DEVELOPMENT

TECHNICAL FIELD

The present invention relates generally to educational devices and methods for the promotion of reading and vocabulary knowledge. More particularly, the present invention relates to a text storage and retrieval educational device that facilitates a reader's vocabulary growth. More specifically, the present invention relates to a portable, electronic educational device that optimizes vocabulary growth by furnishing contextually sensitive illustrative sentences from which the reader may learn the meaning of new words during the course of reading.

BACKGROUND ART

It has long been recognized that vocabulary mastery is directly related to educational success. Historically, student vocabulary growth has been nurtured by reading a large diet of textual works such as books and other stories. In recent years electronic innovations have made possible the use of devices to store, search and selectively retrieve textual works, such as that disclosed in U.S. Pat. No. 4,159,417. These so-called electronic books have become increasingly popular with educators due in part to the ease with which they can present additional information to assist the reader in learning the meaning of a new word.

For example, in U.S. Pat. No. 4,406,626 an electronic teaching aid displaying text on a television screen allows the audible output and visual presentation of the dictionary definition of designated words. U.S. Pat. No. 4,579,533, a continuation-in-part of U.S. Pat. No. 4,406,626, presents a more recent, microprocessor-based version of that electronic teaching aid. Both visual animation and verbal descriptions of concepts such as the principals of electronics are furnished by the electronic textbook shown in U.S. Pat. No. 4,854,878.

Research has made clear, however, that attempting to learn the meaning of new words using dictionary-based strategies is, at least for younger readers, difficult and often unsuccessful at conveying the contextually-correct meaning of words. Such readers often find dictionary definitions confusing, in large measure because when using dictionary definitions meanings are discovered by substitution. Substitution involves taking a single word in a definition and, assuming that it is a reasonable synonym for the entire meaning of the new word, substituting it for the new word. Since many of the simple words used to define more complicated ones are polysemous, in other words have multiple meanings, the reader often accidentally and unknowingly chooses a context-inappropriate sense for the new word.

We have found that by presenting meanings in context, misunderstandings are minimized. Moreover, because of most readers' natural skill at learning from context, and with the greater concentration often given to an engaging story, presenting meanings in context yields even greater improvement in permanent vocabulary growth. Other highly desirable features of an educational device and method to enhance vocabulary growth would include mechanisms for testing the reader's understanding and monitoring vocabulary progress.

SUMMARY OF THE INVENTION

It is, therefore, an object of the present invention to provide an educational device and method for facilitating vocabulary development.

It is another object of the present invention to provide an educational device and method, as above, which optimizes vocabulary growth by furnishing context-sensitive illustrative sentences from which the reader may learn the meaning of new words during the course of reading.

It is still another object of the present invention to provide an educational device and method, as above, that carefully times the presentation of such context-sensitive illustrative sentences to further enhance the reader's success at understanding and remembering the contextually-correct meaning.

It is still a further object of the present invention to provide an educational device and method, as above, that tests the reader's understanding of the correct meaning using contextually-sensitive questions.

It is an additional object of the present invention to provide an educational device and method, as above, that monitors the reader's vocabulary growth progress.

These and other objects and advantages of the present invention over existing prior art forms will become more apparent and fully understood from the following description in conjunction with the accompanying drawings.

In general, an educational device for facilitating vocabulary development includes a display for displaying reading text and means for selecting portions of the reading text whose meaning may be unfamiliar to a reader and providing a context-sensitive sentence illustrating the meaning of the selected portions of the reading text. The display receives and displays the context-sensitive sentence.

A method for facilitating vocabulary development includes the steps of displaying reading text, selecting portions of the reading text whose meaning may be unfamiliar to a reader, providing a context-sensitive sentence illustrating the meaning of the selected portions of the reading text, and displaying the context-sensitive sentence.

BRIEF DESCRIPTION OF THE DRAWINGS

FIG. 4 is an example of the display presented just after initiation of the Study function for the target word SILHOUETTE from the book "The Fourth Man" by Agatha Christie. This display includes both a context-sensitive illustrative sentence and an excerpt of the text being read which encompasses the target word. This specific display remains on-screen for a first preselected period, such as 20 seconds plus the time it takes for the context-sensitive illustrative sentence to be read, or about 25 seconds in total, unless sooner terminated by the reader's selection of another function.

FIG. 5 is an example of the display presented during operation of the Study function as depicted in FIG. 4 after completion of the first preselected period. At this time the verification word FIGURE has replaced the target word SILHOUETTE in the context-sensitive illustrative sentence. This specific display remains on-screen for a second preselected period, such as 10 seconds, unless sooner terminated by the reader's selection of another function.

FIG. 6 is an exemplary display generated during operation of the Ask function for the target word SILHOUETTE from the book "The Fourth Man" by Agatha Christie.

FIG. 7 is an exemplary display generated during operation of the Score function.

PREFERRED EMBODIMENT FOR CARRYING OUT THE INVENTION

Figure 1:
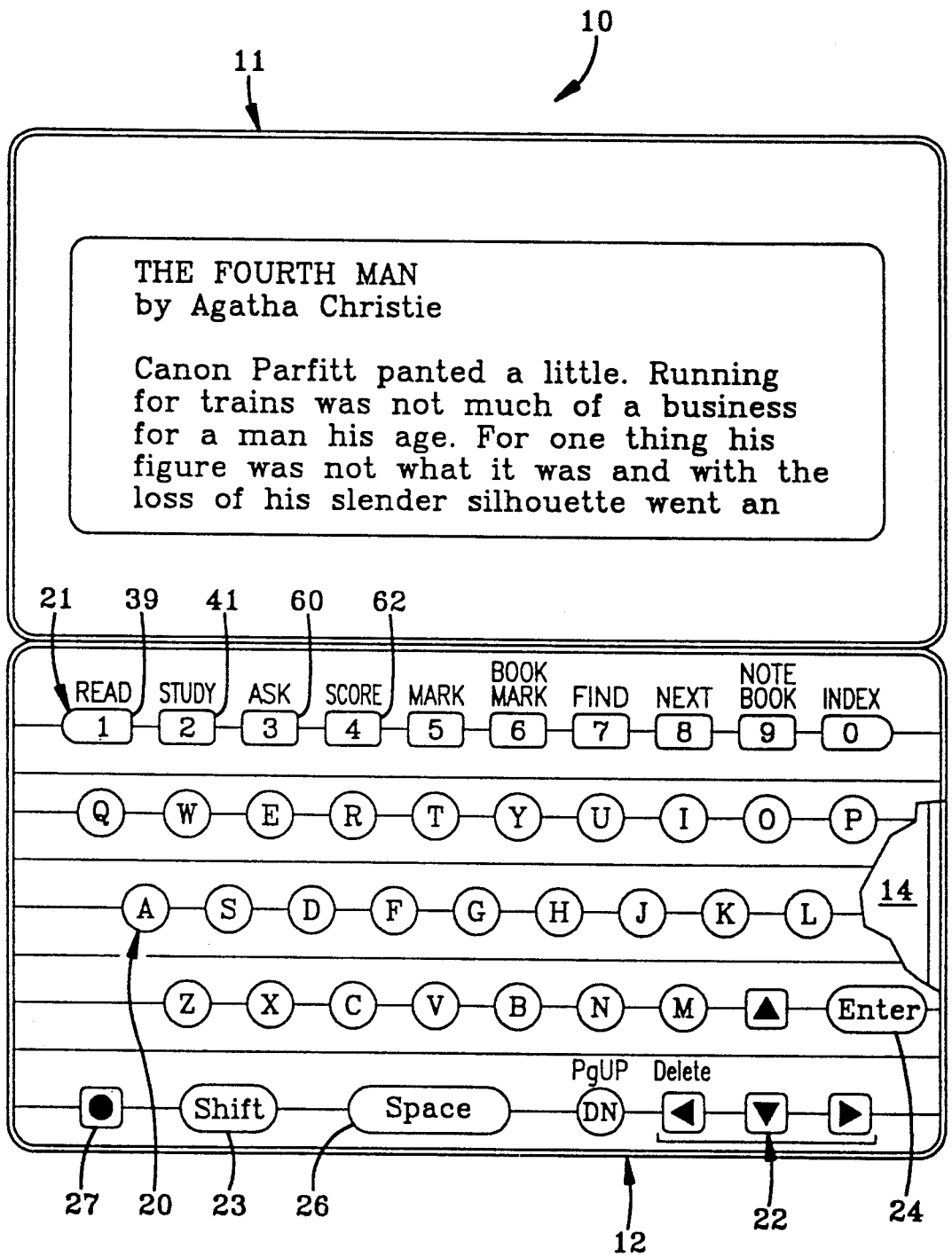
FIG. 1 presents a top view of an exemplary device including keyboard and display for a portable, electronic educational device that optimizes vocabulary growth by furnishing context-sensitive illustrative sentences from which the reader may learn the meaning of new words, in accordance with the present invention.

FIG. 1 presents a top view of an exemplary educational device, generally indicated by the reference numeral 10, that optimizes vocabulary growth by furnishing context-sensitive illustrative sentences from which the reader may learn the meaning of new words. As used herein, any device which includes provisions for facilitating vocabulary growth is an educational device within the spirit of the present invention.

Device 10 is preferably a portable electronic unit having a display 11 and keyboard 12, similar to the hand-held, battery powered, microprocessor controlled electronic textbook commercially available from SelecTronics, Inc. of Minneapolis, Minnesota for storage, searching and selected retrieval of large amounts of text. One model of such SelecTronics unit includes all text from a version of the bible, and is known as the Electronic Bible Model EB-2000. In addition to a similar display and keyboard, the SelecTronics unit includes provision for a user-changeable memory cartridge to provide storage of additional control program code, text, and/or intermediate program and user specified data. The SelecTronics unit also provides several functions and keys whose operation are useful to all devices that store, search and selectively retrieve large amounts of text.

Display 11 and keyboard 12 may be any conventional display and keyboard appropriate for use in the selected environment, here preferably one that is hand-held, controlled by microprocessor 14 (shown in break-away in FIG. 1) and possibly battery-powered. In the exemplary embodiment depicted herein, a display presenting eight lines of text each forty characters wide was found adequate to present all needed text and information, and a 5×10 key matrix was adequate to implement all needed character and function keys.

As shown in FIG. 1, keyboard 12 may be seen to include alphabetic keys 20, numeric keys 21, cursor control keys 22, a shift key 23 to access second functions on selected keys by pressing shift key 23 followed by the key indicating the desired second function, an enter key 24, a space key 26 and a power on/off key 27. The second function accessed by numeric keys 21 may be used to initiate the indicated functions (also called modes of operation). These functions may include Read, Study, Ask, Score, Go-To, Bookmark, Find, Next, Notebook and Index, some of which will be detailed hereinbelow.

Figure 2:
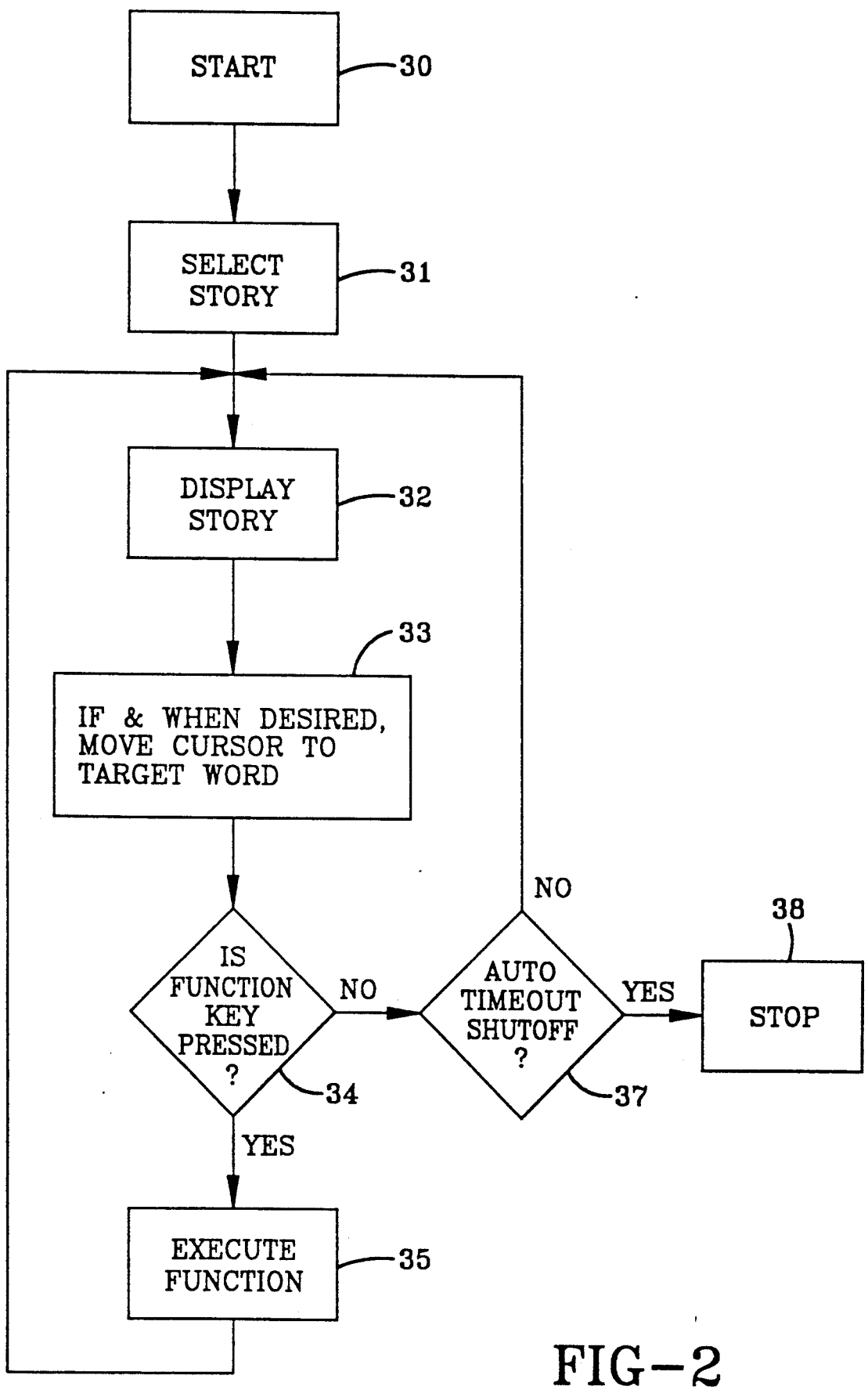
FIG. 2 is a flowchart of an exemplary main control program for the device depicted in FIG. 1.

FIG. 2 presents a flowchart of an exemplary main control program for the device depicted in FIG. 1. Operation is begun by the user (who may be also referred to as the reader or student) pressing on/off key 27, as signified by block 30. If memory, whether permanent or replaceable cartridge, includes more than one text work (also called a story), a list of choices is displayed and a selection made (block 31). Next, the reading display is begun (block 32), as further explained below.

Whenever desired during reading display the cursor control keys 22 may be used to move the cursor to a word or short phrase whose meaning may be unfamiliar to the reader, called the target word (block 33), and the meaning further examined as also explained below. During reading display the pressing of a function key generally results in such function being executed (blocks 34, 35). After a preselected period of inactivity either because of the completion of a story display or a failure of the reader to make any entry, device 10 may be automatically turned off (blocks 37, 38).

The reading display function of device 10 by which the story is scrolled through display 11 for reading, is actuated by pressing the Read function key 39. This function preferably prompts the reader for a desired reading speed in seconds per line, and in the absence of a numeric entry defaults to a preselected speed such as 3.5 seconds per line. Device 10 may be programmed to allow the user to adjust the scrolling speed with preselected keys such as cursor control keys 22.

Figure 3:
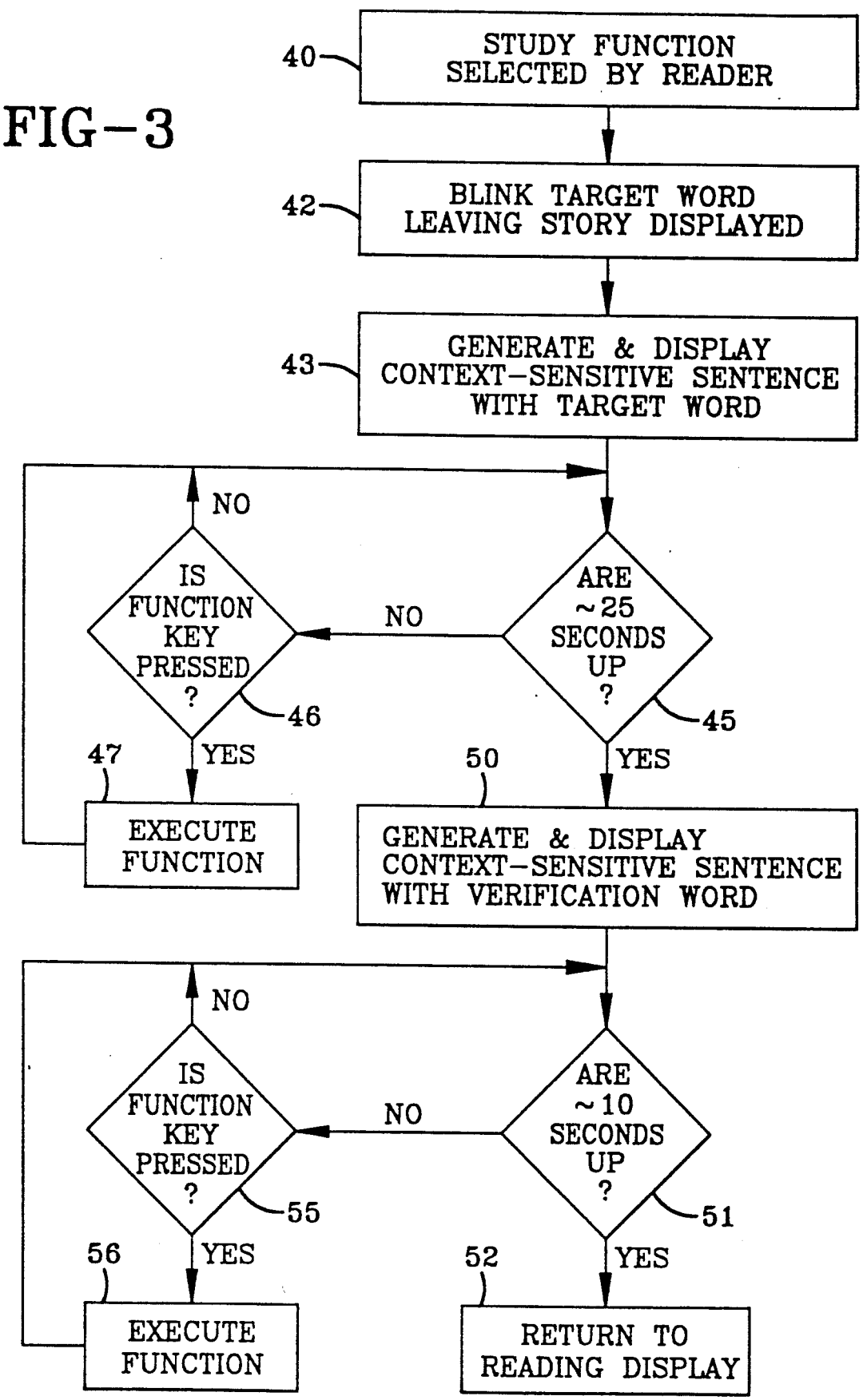
FIG. 3 is a flowchart of the Study function.

Whenever desired during reading display the cursor control keys 22 may be used to move the cursor to a word or short phrase whose meaning may be unfamiliar to the reader, called the target word (block 33), and the meaning further examined as also explained below. FIG. 3 presents a flowchart of the operation of device 10 in performing the Study function, begun as noted in block 40 by pressing the Study function key 41. The Study function is the principal feature for explaining to the reader the meaning of an unfamiliar word or short phrase. However, it is not necessary or practical to provide meanings for all words in a story. This is because for any given story readers' will possess some nominal level of preexisting vocabulary skills, allowing those words or short phrases most likely unfamiliar to be preselected as permissible target words. Accordingly, once the Study function is initiated device 10 locates the nearest preselected target word to the then current location of the cursor on the display and highlights the same as by blinking (block 42). Thereafter a context-sensitive illustrative sentence using that target word, which sentence also may be preselected, is provided by microprocessor 14 and displayed on display 11 in proximity to the portion of the original story where the target word was used (block 43).

We have found it very important to the success of teaching the reader the correct contextual meaning of the target word to enable the reader to examine the original target word usage simultaneously with the context-sensitive illustration. Moreover, we have further found that after allowing adequate time to read the context-sensitive illustrative sentence (several seconds), permitting the reader to view and consider such sentence for a preselected period of time is also very significant in successfully conveying the correct meaning. It has been determined that presenting such sentence for an additional twenty seconds beyond the time required for reading achieves optimal results by allowing the kind of thinking necessary to learn the meaning of the target word by making an educated guess and to remember its meaning.

FIG. 4 shows an example of display 11 presented just after initiation of the Study function for the target word SILHOUETTE from the book "The Fourth Man" by Agatha Christie. This display includes both an excerpt 44 of the text being read which encompasses the target word ("For one thing his figure was not what it was and with the loss of his slender silhouette ...") and a context-sensitive illustrative sentence 41 ("As Canon Parfitt grew older, his SILHOUETTE changed slightly."). This specific display remains on-screen for a first preselected period, such as 20 seconds plus the time it takes for the context-sensitive illustrative sentence to be read, or about 25 seconds in total (block 45), unless sooner terminated by the reader's selection of another function (blocks 46,47).

After the above noted period, a verifying word or phrase replaces the target word in the context-sensitive illustrative sentence 41 (block 50), and after a second preselected period (say about 10 seconds—block 51) is replaced with the original target word and returned to the reading display (block 52). The use of a verifying word or phrase enhances the likelihood that the correct meaning will be discerned and remembered by employing the most common strategy readers use to learn new word meanings—substitution of a reasonable synonym—and furnishing feedback as to whether the reader's inferences about the target word are correct.

FIG. 5 is an example of the display presented during operation of the Study function as depicted in FIG. 4 after completion of the first preselected period. At this time the verification word FIGURE has replaced the target word SILHOUETTE in the context-sensitive illustrative sentence 53. This specific display remains on-screen for the second preselected period, such as 10 seconds, unless sooner terminated by the reader's selection of another function (blocks 55, 56), whereupon the original target word replaces the verification word in the sentence 53 and, after a momentary pause, the original reading display returns.

Device 10 includes a function actuated by pressing the Ask function key 60 for furnishing probe questions designed to have the reader think about the target word. Continuing with the present example, FIG. 6 depicts the question 61 "Did the Canon's SILHOUETTE become smaller as he became older?" Since the Ask function serves as a reinforcement tool, we have found it sufficient to ask simple questions without providing explanations of the correct answers.

Device 10 may monitor performance by tracking, for example, the number of words studied, test questions attempted with the Ask function, and the number of correct or incorrect responses for both the current story and all stories for that session or particular reader. This information may be viewed by pressing the Score function key 62 after which the reader may be presented with a display 63 such as that depicted in FIG. 7.

Inasmuch as the present invention is subject to many variations, modifications and changes in detail, a number of which have been expressly stated herein, it is intended that all matter described throughout this entire specification or shown in the accompanying drawings be interpreted as illustrative and not in a limiting sense. It should thus be evident that a device constructed and method performed according to the concept of the present invention, and reasonably equivalent thereto, will accomplish the objects of the present invention and otherwise substantially improve the art of optimizing reader vocabulary growth with electronic educational devices.

We claim:

1. An educational device for facilitating vocabulary development of a reader, comprising:

display means for displaying reading text; and, processor means for selecting portions of said reading text and providing a context-sensitive sentence that is not a part of said reading text and includes said selected portions of said reading text illustrating the meaning of said selected portions of said reading text the reader having a comprehension of the meaning of said selected portions of said reading text, said processor means including means for testing the reader's comprehension of the correct meaning of said selected portions of said reading text, said display means receiving and displaying said context-sensitive sentence.

2. An educational device, as set forth in claim 1, wherein said means for testing furnishes a context-sensitive question including said selected portions of said reading text, said display means receiving and displaying said context-sensitive question, and said processor means receiving a response to said context-sensitive question from the reader.

3. An educational device, as set forth in claim 1, wherein said processor means further includes means for monitoring the reader's performance in comprehending the correct meaning of said selected portions of said reading text.

4. An educational device, as set forth in claim 3, wherein said means for monitoring tracks information including the number of said context-sensitive sentences provided, the number of said context-sensitive questions furnished, and at least one of the number of correct responses to said context-sensitive questions and the number of incorrect responses to said context-sensitive questions, said display means receiving and selectively displaying said tracked information.

5. A method for facilitating vocabulary development of a reader, comprising the steps of:

displaying reading text by a display means;

selecting portions of said reading text by a processor means, the reader having a comprehension of the meaning of said selected portions of said reading text;

providing a context-sensitive sentence that is not a part of said reading text and including said selected portions of said reading text illustrating the means of said selected portions of said reading text by said processor means;

displaying said context-sensitive sentence; and testing the reader's comprehension of the correct meaning of said selected portions of said reading text.

6. A method for facilitating vocabulary development, as set forth in claim 5, wherein said step of testing further includes the steps of furnishing and displaying a context-sensitive question including said selected portions of said reading text.

7. A method for facilitating vocabulary development, as set forth in claim 5, further including the step of monitoring the reader's performance in comprehending the correct meaning of said selected portions of said reading text.

8. A method for facilitating vocabulary development, as set forth in claim 7, wherein said step of monitoring further includes the steps of tracking information including the number of said context-sensitive sentences provided, the number of said context-sensitive questions furnished, and at least one of the number of correct responses to said context-sensitive questions and the number of incorrect responses to said context-sensitive questions, and selectively displaying said tracked information.

* * * * *